United States Patent [19]

Rupert et al.

[11] 4,226,474

[45] Oct. 7, 1980

[54] SAFETY VEST

[75] Inventors: Dorothy G. Rupert, 1265 Franklin La., Buffalo Grove, Ill. 60090; Frieda A. Stobberingh, Prospect Heights, Ill.

[73] Assignee: Dorothy Gloria Rupert, Buffalo Grove, Ill.

[21] Appl. No.: 49,420

[22] Filed: Jun. 18, 1979

[51] Int. Cl.³ .............................................. A47C 31/00
[52] U.S. Cl. ..................................... 297/484; 297/465
[58] Field of Search ............... 297/483, 484, 485, 465; 128/134

[56] References Cited

U.S. PATENT DOCUMENTS

| | | | |
|---|---|---|---|
| 758,123 | 4/1904 | Weis | 128/134 X |
| 3,218,104 | 11/1965 | Putman | 297/484 X |
| 3,380,776 | 4/1968 | Dillender | 297/484 |
| 3,385,633 | 5/1968 | Aizley | 297/484 X |
| 4,099,770 | 7/1978 | Elsholz | 297/484 X |
| 4,099,778 | 7/1978 | Lehr | 297/484 X |
| 4,117,840 | 10/1978 | Rasure | 128/134 |

FOREIGN PATENT DOCUMENTS

| | | | |
|---|---|---|---|
| 712463 | 6/1965 | Canada | 297/484 |
| 180866 | 6/1922 | United Kingdom | 297/484 |
| 236865 | 7/1925 | United Kingdom | 297/84 |

*Primary Examiner*—James T. McCall
*Attorney, Agent, or Firm*—Lloyd L. Zickert

[57] ABSTRACT

A safety vest to be worn by a person for use in holding a person in a seat and which includes a pair of shoulder straps interconnected by a pair of waist straps, a closure device at the back of the vest and fastener receiving elements on the shoulder straps and one of the waist straps to which may be attached fastening devices associated with the seat for releasably fastening a person wearing the vest to the seat.

12 Claims, 7 Drawing Figures

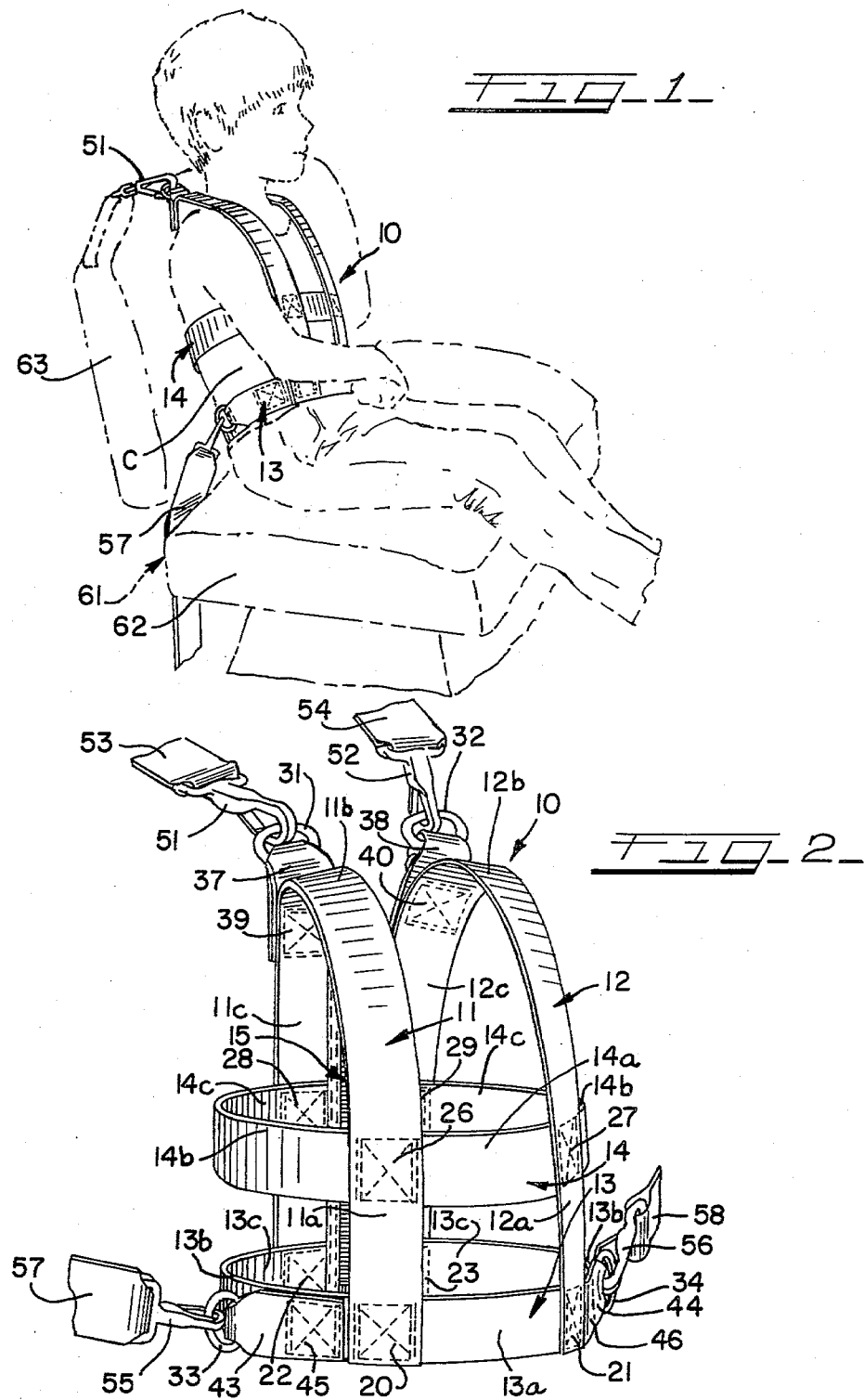

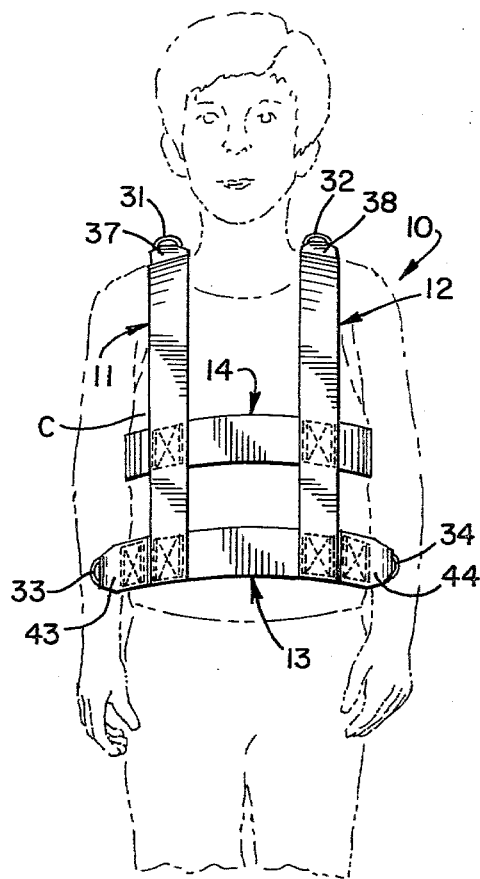
FIG_3_
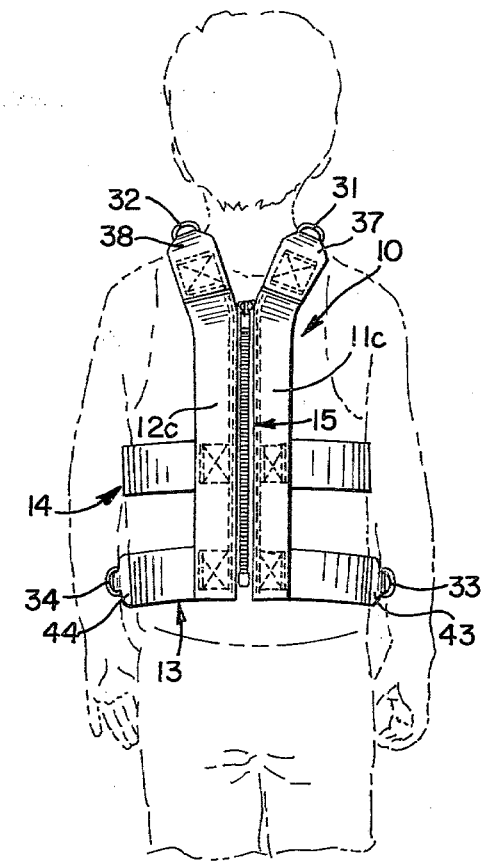
FIG_4_
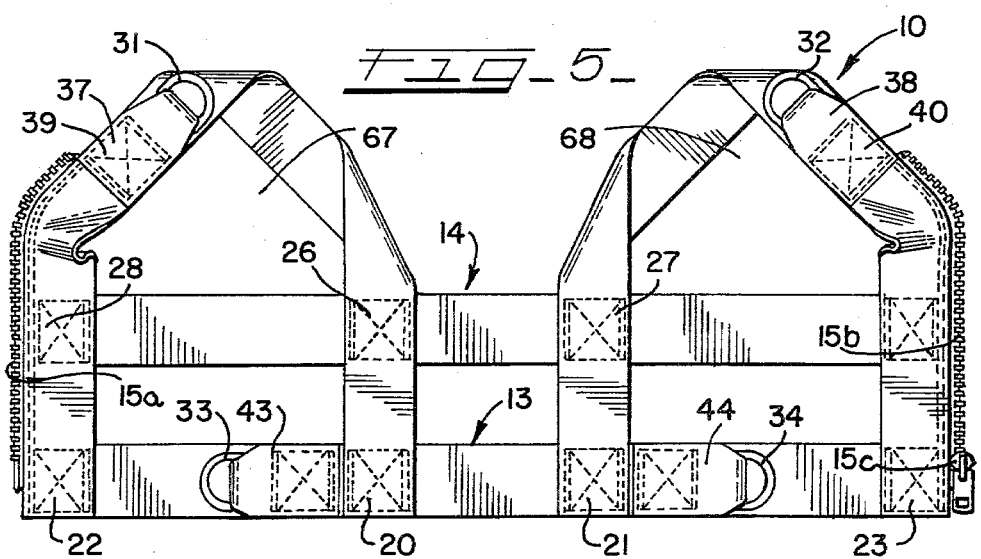
FIG_5_

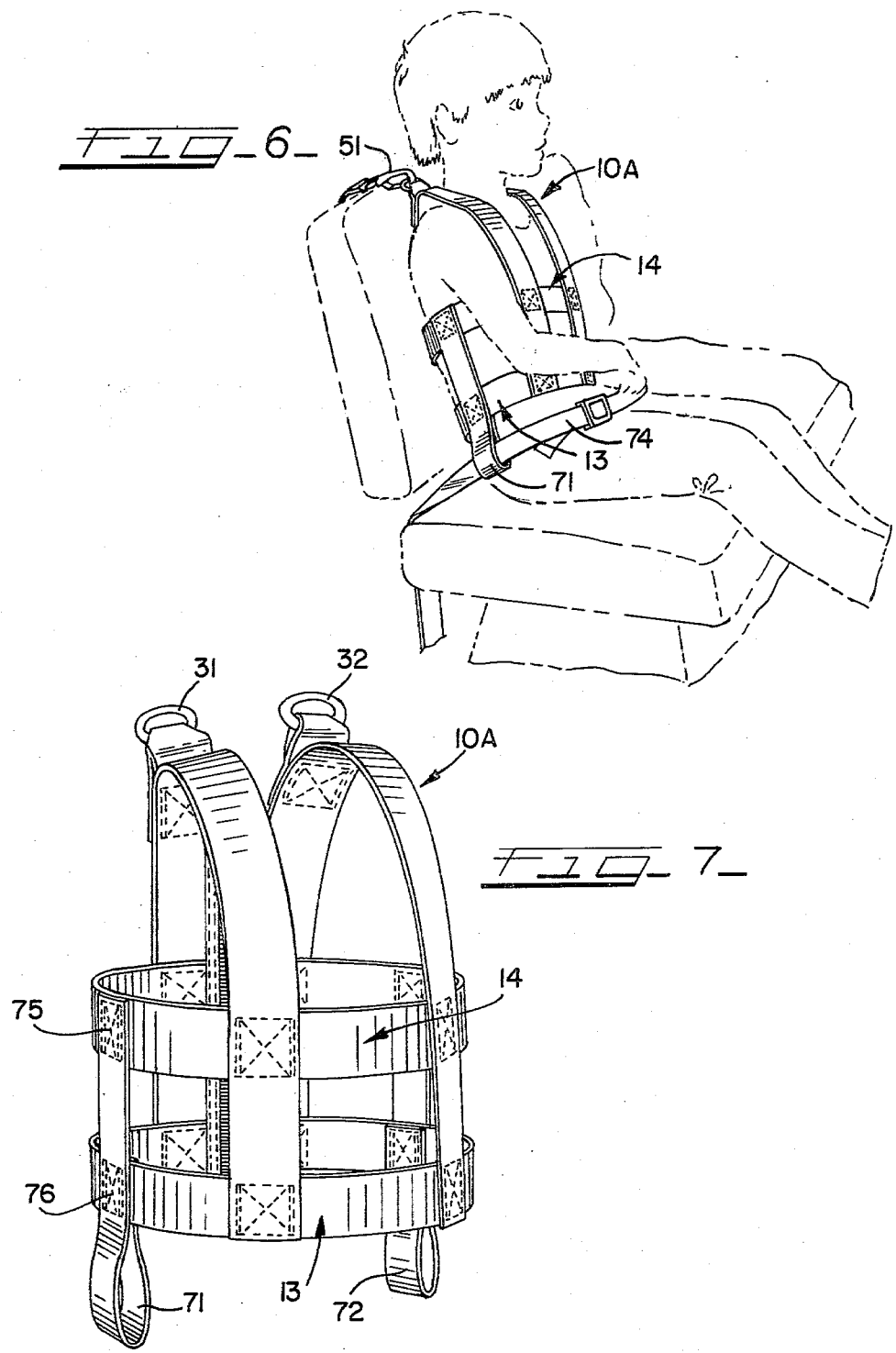

SAFETY VEST

This invention relates in general to a safety vest for a person that is capable of releasably holding a person to a seat, and more particularly, to a safety vest for a handicapped child to fasten the child to the seat of a vehicle and maintain the child in a safe position at all times.

Heretofore, it has been well known to provide seat or lap belts for holding a person to the seat of a vehicle or to the seat of a chair. It has also been known to provide shoulder straps for restraining the movements of a person relative to the seat of a chair. Various other types of belts and harnesses have been known for use in protecting a person transported in airborne and land vehicles.

The present invention is a safety vest that is especially useful for a handicapped child that is capable of comfortably and safely securing a child to a vehicle seat, such as a bus seat, while the child is being transported by bus. The vest of the invention can be worn for a period of time by the child during which the child may be first transported to a location from his home and later transported back home without the necessity of removing the vest. Releasable means is provided for securing the child and vest to the seat of a vehicle, thereby eliminating the necessity to remove the vest from the child at a time when the child is being moved from the vehicle to a place of other activity. The vest is worn on the upper torso of the child's body and includes shoulder and waist straps. Closure means is provided for opening the vest to fit it on the child and thereafter closing the vest and securing it to the child. Importantly, the closure means is at the back of the vest where it is not accessible to the child, thereby enhancing the child's safety. Fastening members are suitably mounted on the vest for releasably receiving fasteners that may be premanently anchored to the vehicle.

While the safety vest of the invention is particularly useful for handicapped children, it can likewise be used by any person where it is desired to safely restrain a person to a seat. Further, while the harness is especially useful for restraining a person to the seat of a vehicle, it can be appreciated that it could be used for restraining a person to a seat that is fixed to a floor of a building, such as in the classroom of a school. There are instances where a handicapped child needs considerable support for maintaining a seated position, and the safety vest of the present invention is capable of satisfying that need. It can be appreciated that the safety vest could not only be used in connection with restraining a child to the seat of a vehicle, but it could be likewise used when the child is transferred from the vehicle to a classroom, and then the child may be restrained to a desk or seat in the classroom by use of the vest.

It is therefore an object of the present invention to provide a new and improved safety vest for use with a person to securely and safely hold the person in a seat of a vehicle or a buliding.

It is a further object of the present invention to provide a safety vest for a handicapped child to restrain the child in the seat of a vehicle and which is fastened onto the child with a closure means disposed at the back of the child and not readily accessible to tampering by the child's hands.

A still further object of the present invention is in a safety vest that can be worn by a child and which is provided with means allowing the child to be releasably fastened to the seat of a vehicle or the seat of a desk without the need of dismounting the vest from the child during the time the child is moved from the vehicle to the desk.

Other objects, features and advantages of the invention will be apparent from the following detailed disclosure, taken in conjunction with the accompanying sheets of drawings, wherein like reference numerals refer to like parts, in which:

FIG. 1 is a perspective view of the safety vest of the present invention illustrated in mounting relation on a child in a seat of a vehicle where the vest is fastened to the vehicle by releasable fastening means;

FIG. 2 is an enlarged perspective view of the vest illustrated in FIG. 1 removed from the child to illustrate its components and the manner in which it may be secured to fastening elements;

FIG. 3 is a front elevational view of the vest of FIGS. 1 and 2 and illustrating it in position on a child in standing position;

FIG. 4 is a rear elevation view of the vest of FIGS. 1 to 3 as mounted on a child;

FIG. 5 is an elevational view of the vest in opened position;

FIG. 6 is a view similar to FIG. 1 but illustrating a modified safety vest according to the invention which is at least partly secured to the vehicle by means of a standard lap or seat belt; and FIG. 7 is an enlarged perspective view of the vest illustrated in FIG. 6.

Referring now to the drawings and particularly to the embodiment of the safety vest illustrated in FIGS. 1 to 5, it may be appreciated as to how the safety vest is worn by a person or child C by viewing FIGS. 3 and 4 and as to how the safety vest functions to restrain a child in a seat by viewing FIG. 1.

The vest of this embodiment is generally designated by the numeral 10 and includes a pair of shoulder or vertically disposed straps 11 and 12, a pair of waist or horizontally disposed straps 13 and 14, and a slide fastener closure device or member 15.

The shoulder straps 11 and 12 include front portions or runs 11a and 12a extending in generally parallel spaced relation down the front of the upper torso of the body of the child C, upper portions or segments 11b and 12b extending over the shoulders of the child C, and rear portions or segments 11c and 12c extending vertically along the back of the child in substantially parallel abutting relation.

The lower waist strap 13 includes a front segment 13a, opposed side segments 13b and back segments 13c. The front segment 13a extends across the front portion of the waist of the person, while the side segments 13b extend around the sides of the waist, and the rear segments 13c lay across the rear of the waist. The lower waist strap 13 is arranged at the lower ends of the shoulder straps crossing or intersecting same and particularly the front and rear segments thereof and is secured to the shoulder straps at 20 and 21, while the ends of the waist strap at the rear segments 13c are secured to the lower ends of the rear shoulder strap segments 11c and 12c at 22 and 23. The upper waist or chest strap 14 likewise includes a front portion or segment 14a, opposed side segments 14b and rear segments 14c. The strap 14 crosses the shoulder straps 11 and 12 as does the lower waist strap 13 and terminates at the rear segments 11c and 12c of the shoulder straps 11 and 12. Similarly, the waist strap 14, which is generally parallel to the waist strap 13, is secured to the shoulder strap 11 at 26 and the shoulder strap 12 at 27 at the front of the vest and at the rear segments of the shoulder straps at 28 and 29.

The straps 11, 12, 13 and 14 are of suitably flexible material, such as a standard commercially available nylon webbing, generally used for safety seat belts and the like. The joining of the shoulder straps to the waist straps at the junctions 20 to 23 and 26 to 29 are accomplished preferably by a suitable cross-stitching of nylon thread.

The front segments 11a and 12a of the shoulder straps 11 and 12 are spaced apart by virtue of being connected to the waist straps at spaced-apart points, while the rear segments 11c and 12c of the shoulder straps are juxtaposed or in directly side-by-side relation as illustrated in FIG. 4. The waist straps 13 and 14 are in spaced-apart relation, the waist strap 13 being disposed substantially at the waistline of the child, and the upper waist strap 14 being spaced upwardly from the waist as illustrated. The vest will be made in various sizes to fit persons of various sizes.

Along the facing edges of the rear segments 11c and 12c of the shoulder straps 11 and 12 the closure device 15 is suitably secured. While the closure device may take any suitable form, it is illustrated as a zipper or slide fastener and as shown in FIG. 5 provided with mating zipper or slide fastener sections 15a and 15b with a slide 15c. The vest is illustrated in open condition in FIG. 5 with the zipper portions separated and in closed position in FIGS. 2 and 4. It will be appreciated that the zipper closure is disposed to be at the back of the child, thereby making it difficult if at all possible for the child to operate the zipper and disconnect the vest from the child's body. That the vest engages the upper torso of the child's body as illustrated in FIGS. 1, 3 and 4 will provide the best possible protection of the child's body and will give the best possible restraining action to the body.

Fastening elements are provided on the vest for attachment to fastening members so that the child can be restrained in a seat as illustrated in FIG. 1. More particularly, fastening elements are provided on the shoulder straps at the upper portions and at the lower waist strap along the side portions thereof. The fastening elements illustrated in the embodiment of FIGS. 1 to 4 include metal rings 31 and 32 for the shoulder straps and metal rings 33 and 34 for the waist strap 13. While the metal rings may take any form, one suitable form is a D-shaped ring, and the rings are fastened to the respective straps by loop portions of webbing. More specifically, webbing loops 37 and 38 are formed and suitably secured to the shoulder straps 11 and 12 by nylon stitching or the like for receiving rings 31 and 32. Specifically, the webbing loops 37 and 38 are respectively attached to the shoulder straps at 39 and 40. Similarly, webbing loops 43 and 44 are attached to the side segments of the lower waist strap 13 by suitable stitching 45 and 46 for securing the rings 33 and 34 to the lower waist strap. It may be appreciated that the rings may be attached to the upper waist strap if desired or rings may be attached to both the lower and the upper waist straps. However, it is preferable to connect the rings to the lower waist strap.

As seen particularly in FIG. 2, snap fasteners 51 and 52 attached to the ends of anchoring straps 53 and 54 releasably engage the upper shoulder strap rings 31 and 32. These anchoring straps are suitably connected to the seat in which the child may ride or they may be attached to suitable eye bolts on the floor of the vehicle or the floor of the building receiving the seat. Similarly, snap fasteners 55 and 56 secured to ends of anchoring straps 57 and 58 releasably connect to the waist rings 33 and 34. Again, the anchoring straps 57 and 58 would be connected to the seat or floor of the vehicle in any suitable manner.

As illustrated in FIG. 1, a seat 61 having a seat portion 62 and a back portion 63 is illustrated for receiving the child C. Similarly, the straps and associated snap fasteners are illustrated for releasably connecting the child to the seat when such is desired. For example, if the child is to be transported by bus, the seat 61 would be a bus seat and the anchoring straps would preferably be connected to the floor of the bus although they may be connected to the seat if so desired. These anchoring straps with snap fasteners remain with the vehicle at all times, and it is a simple matter to have a child in seated position secured to the vehicle at the appropriate rings of the safety vest so that the child will ride comfortably and safely in the bus. It is not necessary to remove the vest from the child when allowing the child to be removed from the seat. It is only necessary to release the snap fasteners whereby the child may continue to wear the vest for the next activity. For example, the child may go into a classroom with the vest on for engaging in classroom activities. At that time, if anchoring straps with suitable snap fasteners are provided in association with the desk in which the child would sit, the child may be fastened to that desk during the classroom activities. At the end of the day, when the child is to be transported home, it is a simple matter to disconnect the snap fasteners from the vest, place the child in the bus and in a seat where anchoring bolts with snap fasteners can be refastened to the waist and shoulder strap rings for providing a safe and confortable trip home for the child. At the end of the day, the child's parents may remove the vest when it is no longer needed to properly safeguard the child's health. As can be appreciated by the vest 10 illustrated in open condition in FIG. 5, the vest would be applied to the child by having the child extend his arms through the upper opening 67 and 68 made by the shoulder straps and the upper waist strap whereby the rear segments of the shoulder straps can be brought around to the back of the child so that the zipper closure 15 can be closed, thereby fastening the vest in place on the child. The vest is removed from the child merely by opening the zipper closure and stripping the vest from the child's upper torso.

A modified safety vest 10A is illustrated in FIGS. 6 and 7. This vest differs from the safety vest 10 illustrated in FIGS. 1 to 5 only in that in place of the fastening rings 33 and 34 attached to the lower waist strap as illustrated in FIG. 2 loops of webbing material 71 and 72 are formed on the lower waist strap 13 for receiving a lap or safety seat belt 74, as illustrated in FIG. 6. More particularly, the loops 71 are made from a length of webbing material that is connected at one end to the upper waist strap 14 and then to the lower waist strap 13. Specifically, the loop 71 is made of a single length of material that is first attached by stitching at 75 to the upper waist strap 14 at the side segment of the waist strap and then secured as by stitching to the lower waist strap at 76. The end of the material is positioned at the inner surface of the lower waist strap, while the material is otherwise positioned at the outer surfaces of the straps 13 and 14.

The operation of the vest 10A is the same as the vest 10 with the exception that a lap belt 74 is used to go through the loops 71 and 72, as illustrated in FIG. 6, for fastening the lower end of the safety vest to the vehicle. Likewise, the lap belt extends across the lap of the child to provide additional restraining action to the child. The shoulder straps are provided with the same anchoring ring members 31 and 32 as in the first embodiment for engagement by the snap fasteners 51 and 52. This embodiment eliminates the need to install two additional straps with snap fasteners where a lap belt may already be provided. However, restraining action is essentially equal to that provided by the safety vest 10 of the first embodiment.

From the foregoing, it will be appreciated that the safety vest of the present invention is unique in that it need not be removed from the child when the child leaves the transportation vehicle as it only need be disconnected from anchoring elements. Further, it may be appreciated that while the vest is on the child, assistance may be given to the child during walking to and from the bus by an adult grasping the upper portions of the shoulder straps and providing support for the child. With respect to use of the vest in a bus, it will be appreciated that the secure arrangement for restraining the child to the seat eliminates the need for an assistant on the bus and the work of connecting and disconnecting the children from their seats can be handled by the bus driver. In addition to being useful for bus travel, the safety vest may also be used on wheelchairs, classroom desks or for the family car.

It will be understood that modifications and variations may be effected without departing from the scope of the novel concepts of the present invention, but it is understood that this application is to be limited only by the scope of the appended claims.

The invention is hereby claimed as follows:

1. A safety vest for releasably holding a person in a seat, which comprises a pair of shoulder straps extending over the shoulders down the front and back of the person to about waist level, a waist strap at about waist level traversing around the waist crossing the shoulder straps at the front of the person and terminating at the shoulder straps at the back of the person, means fastening said waist strap to the shoulder straps at the crossings and at the back of the person, said shoulder straps being spaced apart at the front of the person and converging over the shoulders of the person and into edge-to-edge relation at the back of the person, slide fastener closure means at the back of the person along upright adjacent edges of said shoulder straps for closing the vest in wearing position on the person, and means at the upper portions of the shoulder straps and the side portions of the waist strap adapted to receive anchoring elements associated with the seat to hold the person in the seat.

2. The safety vest of claim 1, which further includes a chest or upper waist strap paralleling the waist strap and crossing the shoulder straps at the front of the person and terminating at the shoulder straps at the back of the person, and chest strap being fastened to the shoulder straps at the crossings and at the back of the person.

3. The safety vest of claim 2, wherein the means receiving anchoring elements at the upper portion of the shoulder straps and the side portions of the waist strap include rings secured thereto and adapted to be engaged by snap fasteners.

4. The safety vest of claim 2, wherein the means receiving anchoring elements at the upper portion of the shoulder straps includes rings secured thereto adapted to be engaged by snap fasteners, and the side portions of the waist strap including loops through which a lap belt may be received.

5. The safety vest of claim 2, wherein said straps are of nylon webbing and connected together by nylon stitching.

6. A safety vest adapted to be worn on the upper torso of a person for releasably holding a person in a seat, which comprises a pair of vertically disposed straps fitting over the shoulders, over the chest and the back of the person, said vertical straps being spaced apart over the chest and converging over the shoulders of the person and into edge-to-edge relation at the back of the person, a pair of horizontally disposed straps interconnected with the vertically disposed straps, said horizontally disposed straps crossing said vertically disposed straps at the front of the vest and terminating at the vertically disposed straps at the back of the vest, a closure means at the back of the vest between the edges of said vertically disposed straps for opening and closing the vest during removal of the vest from and application to a person, and fastening means at the upper portions of the vertically disposed straps and the side portions of one of the horizontally disposed straps adapted to receive fastening elements associated with the seat to fasten the vest with a person to the seat.

7. A safety vest as defined in claim 6, wherein said fastening means on the vertically and horizontally disposed straps include ring members.

8. A safety vest as defined in claim 6, wherein said fastening means on the vertically disposed straps includes ring members for receiving snap fasteners and on the horizontally disposed straps includes loops for receiving a lap belt.

9. A safety vest for holding a person in a seat comprising,
   a pair of shoulder straps, a waist strap, a chest strap, and a slide fastener closure means,
   said shoulder straps extending across the shoulders down to the waist along the front and back of the person and being spaced apart at the front of the person and converging over the shoulders of the person and into edge-to-edge relation at the back of the person,
   said waist and chest straps crossing said shoulder straps at the front and being fastened at the crossings and extending around the sides of the person to the shoulder straps at the back and being fastened thereto,
   said closure means being disposed at the back of the person connecting the upright edges of the shoulder straps together,
   and connection means on the shoulder straps and the waist strap adapted to be connected to fixed means for the seat to hold a person wearing the vest to the seat.

10. In combination with a seat having a seat portion and a back portion, a safety vest to be worn by a person and fastening means for the seat to releasably connect the vest with a person to the seat,
   said safety vest including a pair of shoulder straps extending over the shoulders down the front and back of the person to about waist level, a waist strap at about waist level traversing the waist crossing the shoulder straps at the front of the person and terminating at the shoulder straps at the back of the person, means fastening said waist strap to the shoulder straps at the crossings and at the back of the person, a chest strap paralleling the waist strap at about chest level traversing the chest crossing the shoulder straps at the front of the person and terminating at the shoulder straps at the back of the person, means fastening said chest strap to the shoulder straps at the crossings and at the back of the person, said shoulder straps being spaced apart at the front of the person and converging over the shoulders of the person and into edge-to-edge relation at the back of the person, slide fastener closure means at the back of the person along the upright adjacent edges of said shoulder straps for closing the vest in wearing position on the person, and connecting means secured at the upper portions of the shoulder straps and the side portions of the waist strap for connection to the fastening means, and said fastening means including means at the seat portion for connection to the connecting means at the waist strap, and means at the upper part of the back portion for connection to the connecting means at the shoulder straps.

11. The combination of claim 10, wherein the connecting means at the shoulder straps and at the waist strap are rings, and the means at the seat portion and the back portion for connection to the connecting means at the waist strap and the shoulder straps are strap means having snap fasteners.

12. The combination of claim 10, wherein the connecting means at the shoulder straps are rings and at the waist strap are loops, and the means at the seat portion for connection to the connecting means at the waist strap is a lap belt and the means at the back portion for connection to the connecting means at the shoulder straps are strap means having a snap fasteners.

* * * * *